United States Patent
Shin

(10) Patent No.: US 7,656,772 B2
(45) Date of Patent: Feb. 2, 2010

(54) OPTICAL READING/WRITING APPARATUS AND METHOD

(75) Inventor: Yun Sup Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 592 days.

(21) Appl. No.: 11/315,194

(22) Filed: Dec. 23, 2005

(65) Prior Publication Data

US 2006/0143636 A1  Jun. 29, 2006

(30) Foreign Application Priority Data

Dec. 27, 2004  (KR) ................ 10-2004-0113189

(51) Int. Cl.
*G11B 7/135* (2006.01)
(52) U.S. Cl. ................ 369/112.23; 369/44.14
(58) Field of Classification Search ........ None
See application file for complete search history.

(56) References Cited

U.S. PATENT DOCUMENTS

| | | | | |
|---|---|---|---|---|
| 5,539,573 A | * | 7/1996 | Schalz et al. ........ 359/381 |
| 6,157,598 A | * | 12/2000 | Mowry ............ 369/44.23 |
| 6,226,238 B1 | * | 5/2001 | Kasono ........... 369/44.23 |
| 6,373,811 B1 | * | 4/2002 | Ikegame et al. ....... 369/199 |
| 6,507,540 B1 | * | 1/2003 | Berg et al. .......... 369/13.13 |
| 2002/0075784 A1 | * | 6/2002 | Kim ............. 369/112.24 |
| 2003/0218946 A1 | * | 11/2003 | Huang et al. ........ 369/44.23 |

FOREIGN PATENT DOCUMENTS

| CN | 1084644 A | 3/1994 |
|---|---|---|
| JP | 2000-163792 A | 6/2000 |

* cited by examiner

*Primary Examiner*—Peter Vincent Agustin
*Assistant Examiner*—Aneeta Yodichkas
(74) *Attorney, Agent, or Firm*—Birch, Stewart, Kolasch & Birch, LLP

(57) ABSTRACT

There is provided an optical reading/writing apparatus. The optical reading/writing apparatus includes an object lens barrel for mounting an object lens, an SIL (solid immersion lens) barrel for mounting an SIL, the SIL barrel being separated from the object lens barrel, and a movement control unit for selectively aligning the SIL with the object lens according to a type of an optical storage medium.

15 Claims, 5 Drawing Sheets

OPTICAL READING/WRITING APPARATUS AND METHOD

BACKGROUND OF THE INVENTION

1. Field of the Invention

The present invention relates to an optical reading/writing apparatus and method.

2. Description of the Related Art

In recent years, a high-density optical storage medium such as a Blue-Ray disk (BD) that can store a large capacity of high definition video data and high quality audio data has been developed.

As standardization of the BD is quickly progressed, it is expected that related products will be developed and commercialized.

As a next generation of the optical reading/writing driver, a variety of drives relating to the BD have been introduced. The BD can store 25 GB data on its single surface. When the BD is a dual layer disk, it can store about 50 GB video/audio data.

In order to increase the storage capacity of the optical storage medium, a wavelength of laser beams is shortened or a numerical aperture of an object lens is enlarged.

FIG. 1 is a schematic view of an optical reading/writing apparatus according to the related art.

Referring to FIG. 1, beams emitted from a laser diode 10 are converted into parallel beams by a collimator lens 11. Then, the parallel beams are converged on a disk by an optical lens 13 after they pass through a beam splitter 12.

The beam reflected from the disk 14 is transmitted to the beam splitter 12 via the object lens 13 and is then reflected to an optical detector 16 via a sensor lens 15.

However, in an optical system depicted in FIG. 1, the reduction of the wavelength to increase a storage capacity is at the end of its limitation. In addition, the enlargement of the numerical aperture in a conventional far-field optical reading/writing method cannot sufficiently increase the storage capacity.

Therefore, in order to increase the storage capacity, a near-field optical reading/writing method using a solid immersion lens (SIL) has been used. This is illustrated in FIG. 2.

As shown in FIG. 2, in the near-field method, an SIL 22 is disposed below an object lens 21. The SIL 22 is semi-spherical and formed of a medium having a refractive index greater than 1. By the SIL lens 22, the numerical aperture of the object lens 21 becomes n*NA to be above 1, thereby dramatically increasing the storage capacity.

Meanwhile, as shown in FIG. 3, since the SIL 22 is fixedly mounted on a barrel 30 together with the object lens 21, it is impossible to use other types of disks. That is, a variety of disks such as the BD, the digital versatile disk (DVD), a compact disk (CD) and the like cannot be compatibly used. Therefore, users have to use both existing optical drives and new optical drives to use both new and existing optical disks.

SUMMARY OF THE INVENTION

Accordingly, the present invention is directed to an optical reading/writing apparatus and method that substantially obviate one or more problems due to limitations and disadvantages of the related art.

An object of the present invention is to provide an optical reading/writing apparatus that is designed to selectively use an SIL according to a type of an optical storage medium, thereby making it possible to compatibly use a near-field optical reading/writing method and other methods.

Another object of the present invention is to provide an optical reading/writing apparatus and method that have an SIL separated from an object lens and means for selectively moving an SIL to effective or ineffective position, thereby making it possible to compatibly use a near-field optical reading/writing method and other methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an optical reading/writing apparatus including: an object lens barrel for mounting an object lens; an SIL (solid immersion lens) barrel for mounting an SIL, the SIL barrel being separated from the object lens barrel; and a movement control unit for selectively aligning the SIL with the object lens according to a type of an optical storage medium.

In another aspect of the present invention, there is provided an optical reading/writing apparatus including: an object lens barrel for mounting an object lens; an SIL (solid immersion lens) barrel for mounting an SIL, the SIL barrel being provided with a beam-passing aperture and separated from the object lens barrel; and a movement control unit for reciprocating the SIL barrel according to a type of an optical storage medium.

In still another aspect of the present invention, there is provided an optical reading/writing apparatus including: an object lens barrel for mounting an object lens; an SIL (solid immersion lens) barrel for mounting an SIL, the SIL barrel being provided with a beam-passing aperture and separated from the object lens barrel; and a movement control unit for rotating the SIL barrel according to a type of an optical storage medium.

In still yet another aspect of the present invention, there is provided an optical reading/writing method including: identifying information of an optical storage medium loaded; and selectively aligning an SIL between an object lens and the optical storage medium loaded according to a type of the optical storage medium loaded.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 4:
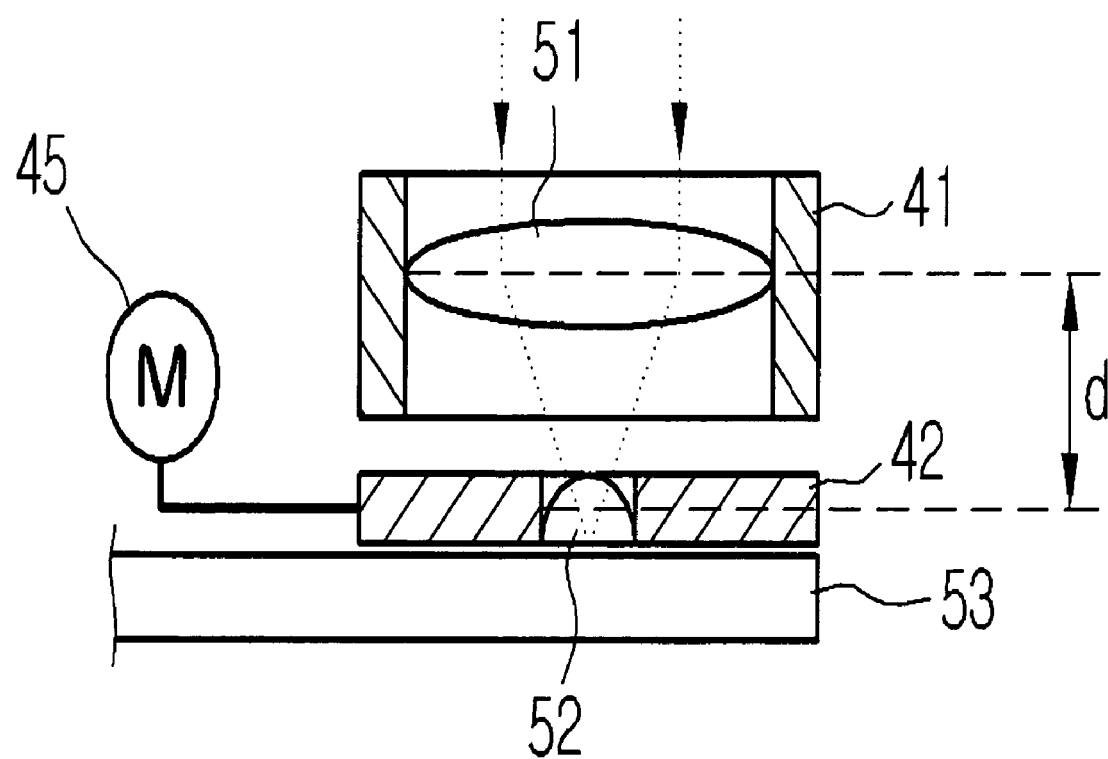
FIG. 4 is a schematic view of an optical reading/writing apparatus according to an embodiment of the present invention, when an object lens is separated from an SIL holder.

FIG. 4 is a schematic view of an optical reading/writing apparatus according to an embodiment of the present invention, when an object lens is separated from an SIL holder.

Referring to FIG. 4, an optical reading/writing apparatus according to this embodiment includes an object lens barrel 41 on which an object lens 51 is mounted and an SIL holder 42 on which an SIL 52 is mounted. The SIL 52 is spaced apart from the object lens 51 by a predetermined distance in a direction where beams travel.

The SIL holder 42 reciprocates by a movement control unit according to whether the SIL 52 is used. The movement control unit includes a motor 45.

In the above-described optical reading/writing apparatus, the barrels 41 and 42 are separated and spaced apart from each other at a predetermined distance. Therefore, the object lens 51 mounted on the first barrel 41 and the SIL 52 mounted on the SIL holder 42 face each other with a predetermined distance therebetween.

Figure 1:
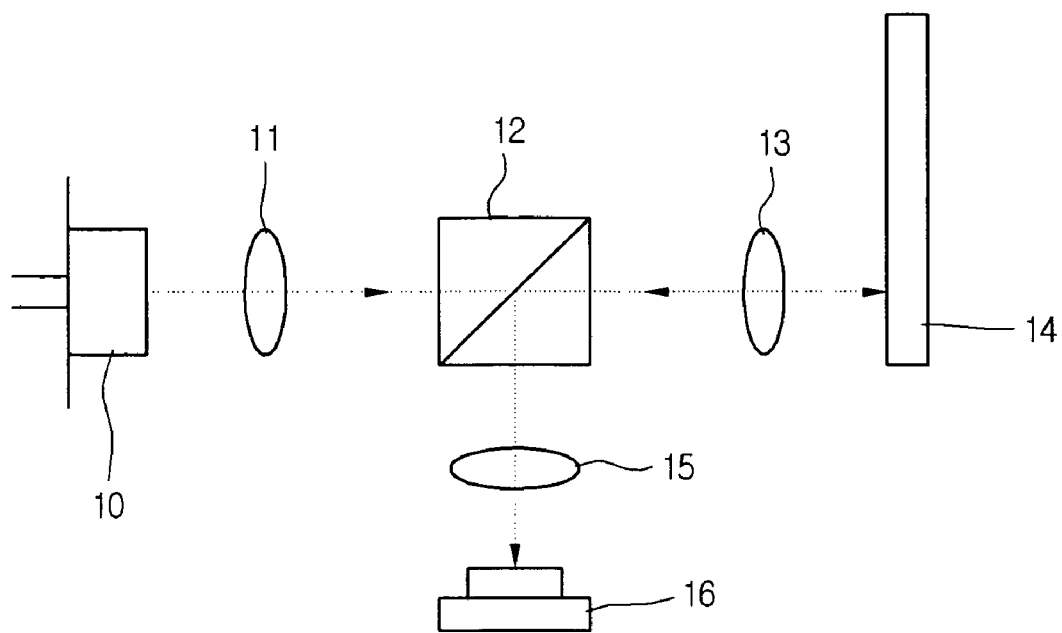
FIG. 1 is a schematic view of an optical reading/writing apparatus according to the related art.
Figure 2:
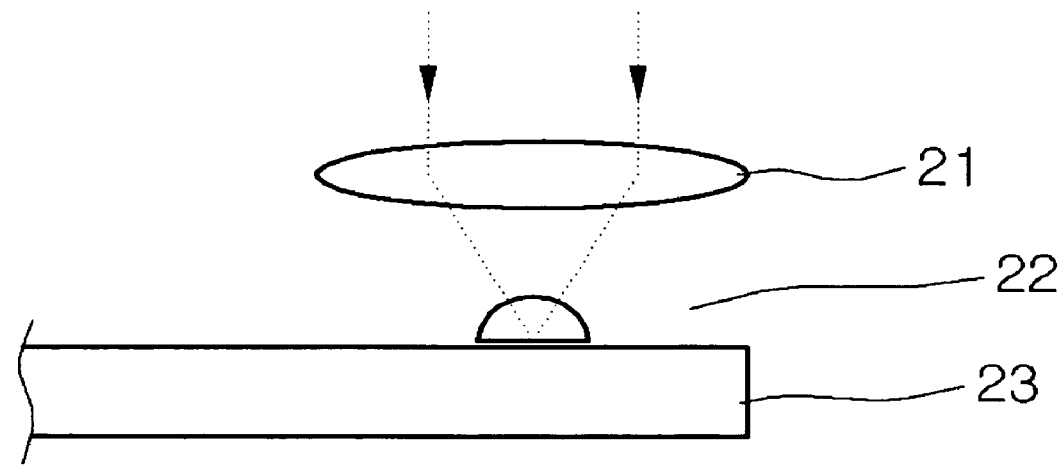
FIG. 2 is a schematic view of an optical system for a near-field optical reading/writing method according to the related art.
Figure 3:
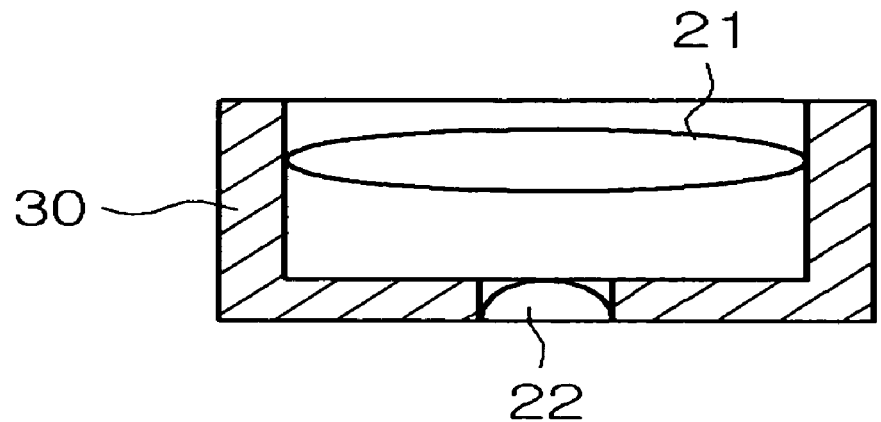
FIG. 3 is a schematic view of a barrel of an optical reading/writing apparatus according to the related art.

At this point, when it is intended to use the object lens 51 for a near-field optical reading/writing method, as shown in FIG. 4, the object lens 51 and the SIL 52 are disposed to face each other with a predetermined distance therebetween. Accordingly, laser beams emitted from the laser diode of the optical system as illustrated in FIG. 1 are converted into parallel beams by the collimator lens and irradiated to an optical storage medium 53 through the object lens 51 and the SIL 52 after they pass through the beam splitter. The beams reflected from the optical storage medium 53 is transmitted to and converged on the optical detector via the object lens by the sensor lens by being reflected from the beam splitter.

At this point, when the optical storage medium is one of the far filed disks and the near-field optical reading/writing method is not used, the SIL holder 42 moves away from the an object lens barrel 41 to an ineffective position. At this point, the motor 45 is driven by a disk-detecting signal from a control server.

That is, the motor 45 rotates clockwise to the SIL holder 42 to the ineffective position. As a result, it becomes possible to the optical storage medium using the far-field optical reading/writing method can be used.

Namely, since the SIL 52 is removed from the beam emitting side of the object lens 51 to the ineffective position, the laser beams can directly irradiated to the optical storage medium 53 through the object lens 51, it becomes possible to read or write data from and on the CD, DVD or BD that are used for the far-field optical reading/writing method.

Alternatively, instead of the SIL holder 42, the object lens barrel 41 may move.

After the above, when it is intended to use an optical storage medium for the near-field optical reading/writing method, the motor rotates counterclockwise to return the SIL holder 42 to an effective position corresponding to the beam emitting side of the object lens 51.

Here, the distance between the object lens 51 and the SIL 52 must be constantly maintained. To realize this, a guide step or groove is formed on the SIL holder 42 or an independent guide member may be further provided.

Although a single optical system as in FIG. 1 is exampled for the descriptive convenience, a variety of optical systems such as an optical system having a laser diode formed with two or three wavelengths, an optical system having three laser diodes, an optical system having a laser diode for the CD/DVD and a laser diode for the BD, and the like may be applied to the present invention.

Also, as the object lens, an object lens that has been used for the DVD, CD and BD can be used for the compatibility with the current CD/DVD method. Here, when there is a need for the compatibility with a plurality of CD/DVD optical reading/writing methods as well as with the near-field optical reading/writing methods, an object lens compatible with the CD/DVD method may be used.

Figure 5:
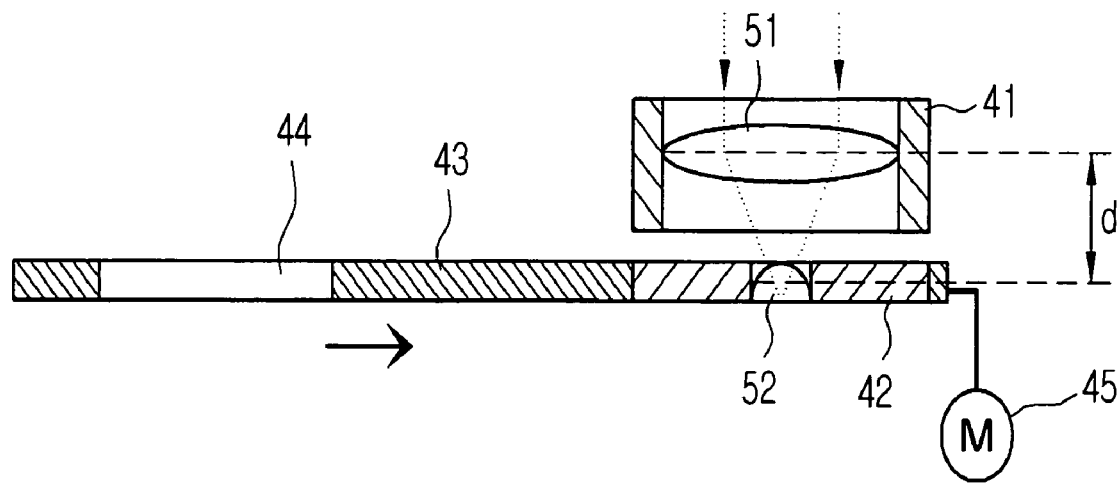
FIG. 5 is schematic views of an optical reading/writing apparatus depicted in FIG. 4, when an SIL is positioned to an effective position.
Figure 6:
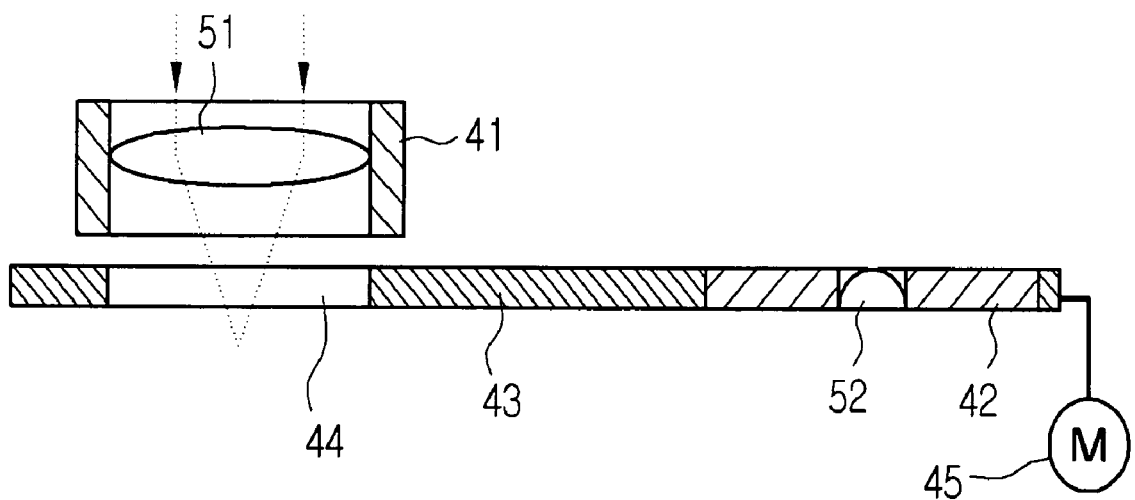
FIG. 6 is schematic views of an optical reading/writing apparatus depicted in FIG. 4, when an SIL is positioned to an ineffective position.
Figure 7:
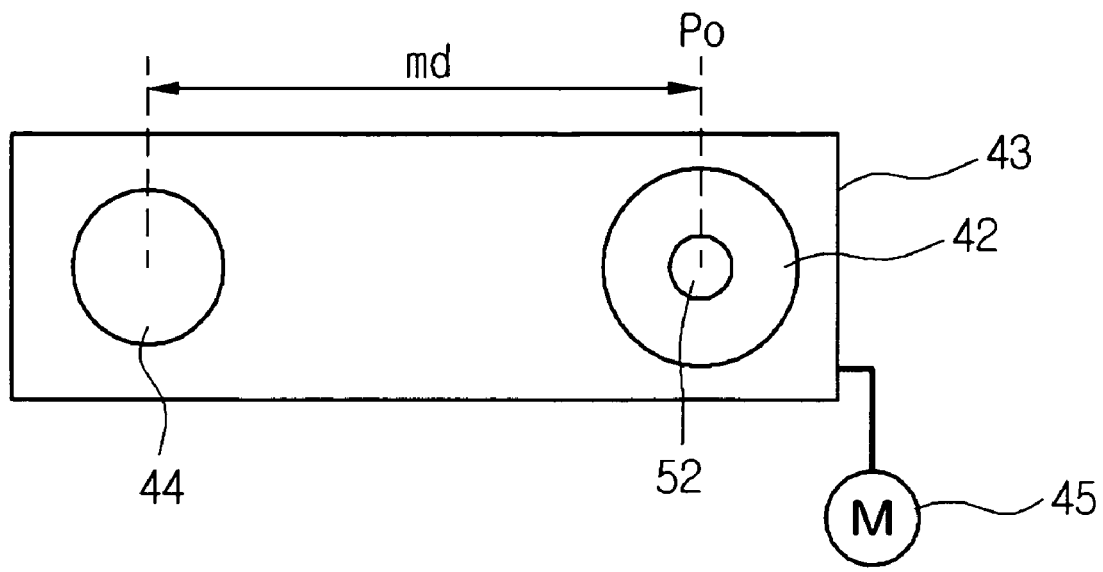
FIG. 7 is a plane view of an SIL holder depicted in FIG. 4.

FIGS. 5 through 7 shows an operation of the optical reading/writing apparatus.

Referring to FIGS. 5 through 7, The SIL holder 42 is mounted on a SIL barrel 43 formed in a plate shape. The SIL barrel 43 is provided with a beam-passing aperture 44.

As shown in FIG. 5, when the SIL 52 is aligned below the object lens 51 mounted on the object lens barrel 41, the optical reading/writing can be performed according to the near-field optical reading/writing method. This position may be set as an effective position.

At this point, in order to use the far-field optical reading/writing method, the SIL barrel 43 linearly moves by the motor 45 such that the beam-passing aperture 44 formed on the SIL barrel 43 can be aligned below the object lens 51.

Here, the beam-passing aperture 44 has a diameter enough large to pass the beam of the object lens 51 therethrough. The beam-passing aperture 44 is formed at a location opposite to a location where the SIL 52 is located so that, when the SIL 52 moves to the ineffective position, it can be positioned to align with the object lens. That is, when the SIL 52 moves to an ineffective position, the beams emitted from the object lens 51 are directly irradiated to the optical storage medium through the beam-passing aperture 44.

When it is intended to use the near-field optical reading/writing method, the motor rotates counterclockwise to move the SIL barrel 43 such that the SIL 52 is positioned to the effective position where the SIL 52 is aligned to the beam emitting side of the object lens 51.

That is, as shown in FIG. 1, the SIL 52 and the beam-passing aperture 44 can be selectively aligned with the object lens 51 by controlling a rotational angle of the motor 45. That is, the motor 45 is controlled to reciprocate the SIL barrel 43 by a predetermined distance md.

Therefore, even when the SIL lens 52 moves from the ineffective position to the effective position, the central alignment between the object lens 51 and the SIL 52 can be precisely realized in a state where they are spaced apart from each other by a predetermined distance.

Figure 8:
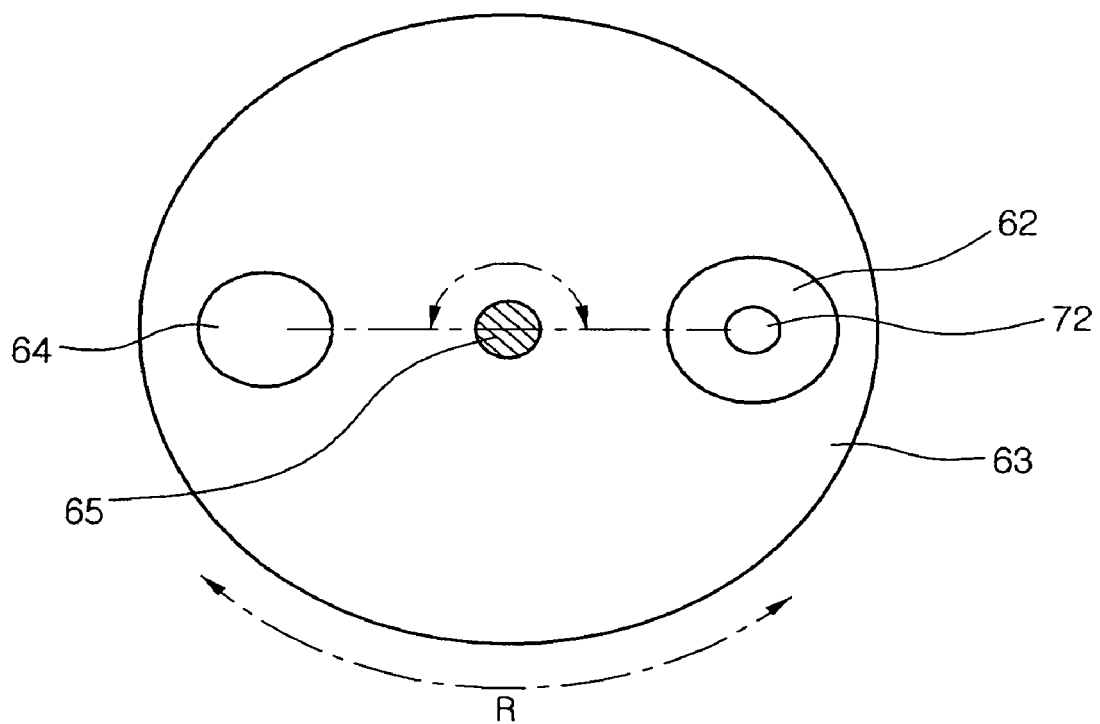
FIGS. 8 and 9 are schematic views of an optical reading/writing apparatus according to another embodiment of the present invention.
Figure 9:
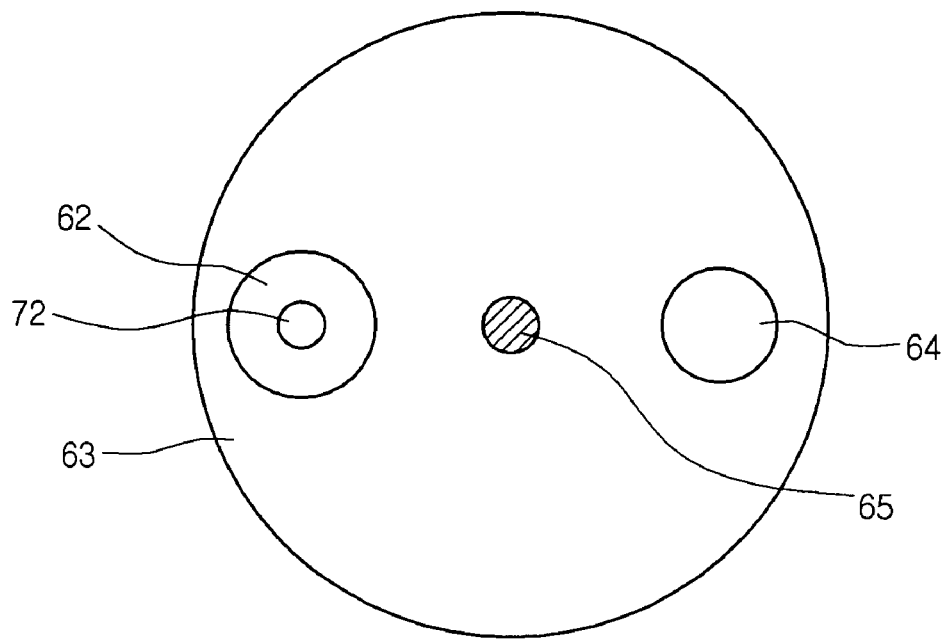

FIGS. 8 and 9 shows an optical reading/writing apparatus according to another embodiment of the present invention.

As shown in FIGS. 8 and 9, there is provided a cylindrical SIL barrel 63 having an SIL 72 and a beam-passing aperture 64. The SIL 72 and the beam-passing aperture 64 are symmetrical. A rotational shaft 65 is installed on a center of the cylindrical SIL barrel 63. The SIL 72 is mounted on a SIL holder 62. The beam-passing aperture 64 has a predetermined diameter.

Therefore, the cylindrical SIL barrel 63 rotates about the rotational shaft 65 according to a type of the disk used so that one of the SIL 72 and the beam-passing aperture 64 can be aligned with the object lens 51. The beam-passing aperture 64 and the SIL 72 are disposed at a predetermined angle relative to each other. The predetermined angle may be less than 180°. Alternatively, the rotational shaft 65 and the SIL barrel 63 may be installed likewise a pendulum in a clock so that the SIL 72 swing back and forth within a predetermined angle range.

Therefore, when a near-field storage medium is inserted, the SIL moves to an effective position aligned with the beam emitting side of the object lens. When a far-field storage medium is inserted, the SIL moves to an ineffective position where the beam-passing aperture is aligned with the object lens. That is, the SIL can be selectively used according to a type of the optical storage medium used.

An optical reading/writing method for different optical storage mediums will be now described with reference to FIG. 10.

Figure 10:
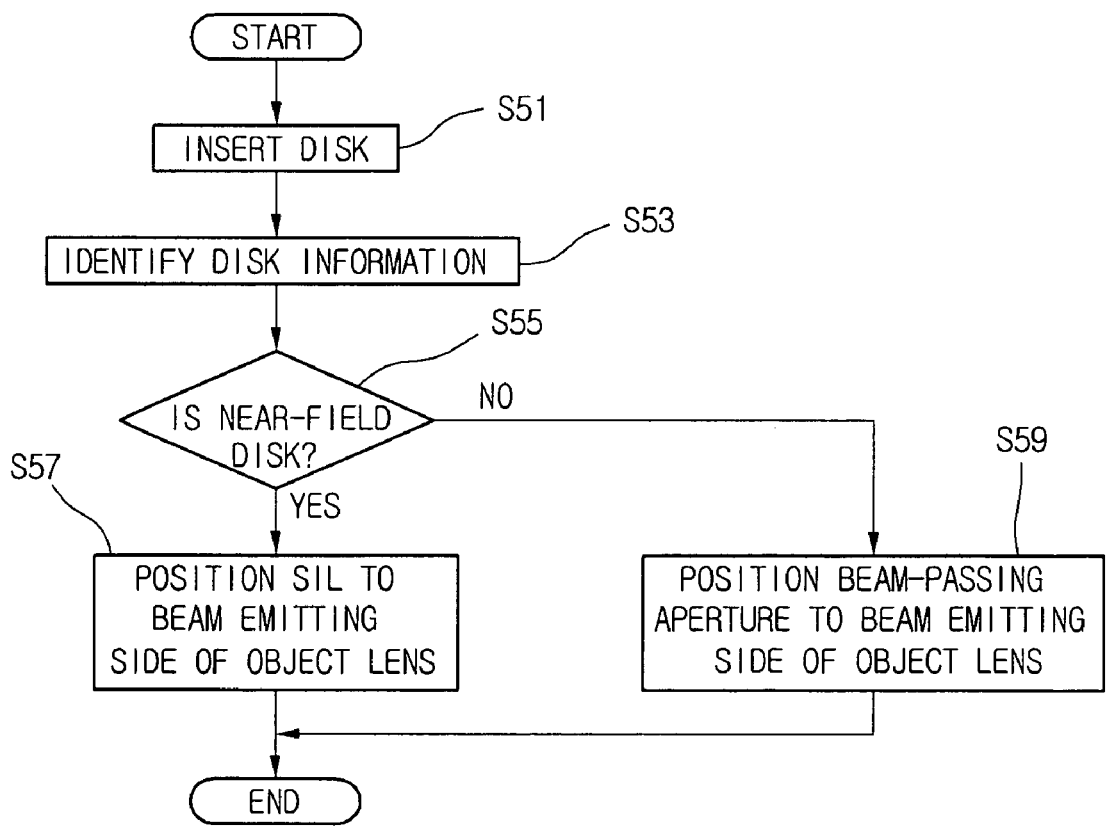
FIG. 10 is a flowchart illustrating an optical reading/writing method according to an embodiment of the present invention.

Referring to FIG. 10, when an optical storage disk is inserted (S51), information of the optical storage disk inserted is detected (S53). Then, it is determined if the optical storage disk is a near-field disk or a far-field disk according to the detected information (S55).

When the optical storage disk is the near-field disk, the SIL is controlled to be positioned to the effective position aligned to the beam emitting side of the object lens by a movement control unit so as to realize a near-field optical system (S57).

When the SIL is currently positioned to the effective position, there is no need to drive the movement control unit. However, when a storage disk that is formerly used is a CD, DVD or BD and thus the SIL is in the ineffective position, the SIL barrel on which the SIL is mounted moves such that the SIL can be returned to the effective position aligned with the object lens.

When the storage disk is the far-field disk, i.e., a CD, DVD or BD, the SIL is positioned to the ineffective position so that the beam-passing aperture is aligned with the beam emitting side of the object lens. That is, by moving the SIL barrel using the movement control unit, the beam emitted from the object lens is directly irradiated to the disk through the beam-passing aperture (S59).

According to the present invention, the SIL used for writing and reading data on and from a high density disk is designed to be selectively positioned to the effective position aligned with the beam emitting side of the object lens, the position of the SIL can be actively and accurately controlled.

In addition, since the SIL is selectively used, the optical reading/writing apparatus is compatible to current BD, DVD and CD methods, thereby increasing the widespread use of the near-field optical information storage method.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical reading/writing apparatus comprising:
an object lens barrel for mounting an object lens;
a solid immersion lens (SIL) barrel for mounting an SIL, the SIL barrel being separated from the object lens barrel; and
a movement control unit for selectively aligning the SIL with the object lens according to a type of an optical storage medium;
wherein the movement control unit moves either the object lens barrel or the SIL barrel to cause a beam to go through both the object lens and the SIL in a near-field type optical storage medium and go through only the object lens in a far-field type optical storage medium.

2. The optical reading/writing apparatus according to claim 1, wherein the SIL barrel is provided with a beam-passing aperture and the movement control unit selectively aligns one of the SIL and the beam-passing aperture with the object lens.

3. The optical reading/writing apparatus according to claim 1, wherein the movement control unit comprises a motor.

4. An optical reading/writing apparatus comprising:
an object lens barrel for mounting an object lens;
a solid immersion lens (SIL) barrel for mounting an SIL, the SIL barrel being provided with a beam-passing aperture spaced from the SIL, the SIL barrel being separated from the object lens barrel; and
a movement control unit for reciprocating the SIL barrel according to a type of an optical storage medium.

5. The optical reading/writing apparatus according to claim 4, wherein the movement control unit controls the reciprocation of the SIL barrel according to whether an optical storage medium is a near-field medium or a far-field medium.

6. The optical reading/writing apparatus according to claim 5, wherein a rotational shaft is formed on a center of the SIL barrel.

7. An optical reading/writing apparatus comprising:
an object lens barrel for mounting an object lens;
a solid immersion lens (SIL) barrel for mounting an SIL, the SIL barrel being provided with a beam-passing aperture spaced from the SIL, the SIL barrel being separated from the object lens barrel; and
a movement control unit for rotating the SIL barrel according to a type of an optical storage medium.

8. The optical reading/writing apparatus according to claim 7, wherein the movement control unit controls the rotation of the SIL barrel according to whether an optical storage medium is a near-field medium or a far-field medium.

9. The optical reading/writing apparatus according to claim 7, wherein the movement control unit is a motor.

10. An optical reading/writing method comprising:
mounting a solid immersion lens (SIL) on an SIL barrel;
mounting an object lens on an object lens barrel separated from the SIL barrel;
identifying information of a loaded optical storage medium;
moving either the SIL barrel or the object lens barrel; and
selectively aligning the SIL between the object lens and the optical storage medium according to a type of the loaded optical storage medium,
wherein a beam goes through both the object lens and the SIL in a near-field type optical storage medium and through only the object lens in a far-field type optical storage medium.

11. The optical reading/writing method according to claim 10, wherein the identifying the information includes determining if the optical storage medium is a near-field optical disk or a far-field optical disk.

12. The optical reading/writing method according to claim 10, wherein, when it is determined that the optical storage medium is the near-field optical disk, the SIL moves to an effective position aligned with the object lens.

13. The optical reading/writing method according to claim 10, wherein, when it is determined that the optical storage medium is the far-field optical disk, the SIL moves to an ineffective position that is not aligned with the object lens.

14. The optical reading/writing method according to claim 10, further comprising applying rotational force to move the SIL.

15. The optical reading/writing method according to claim 10, further comprising applying reciprocating force to move the SIL.

* * * * *